Feb. 14, 1939.  R. MacFARLANE ET AL  2,146,829
CONTINUOUS BASE RECEPTACLE
Filed June 4, 1938
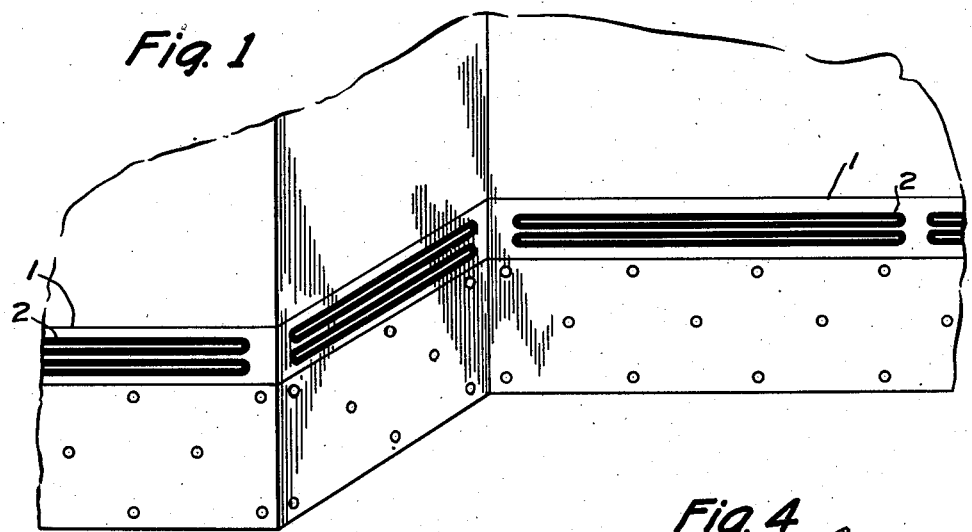
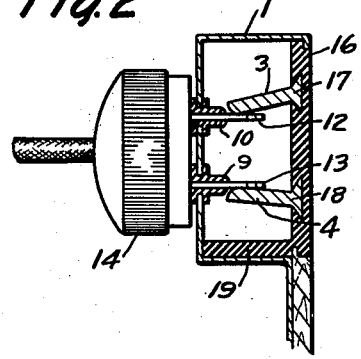
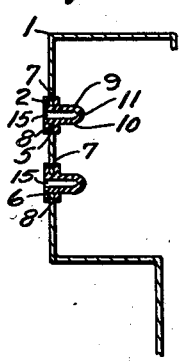
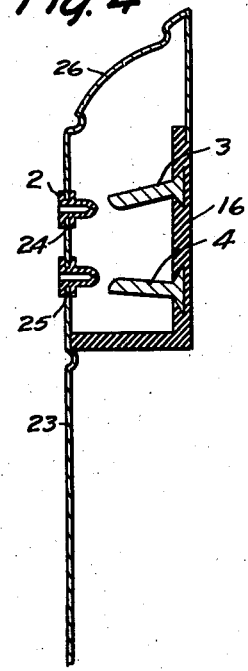
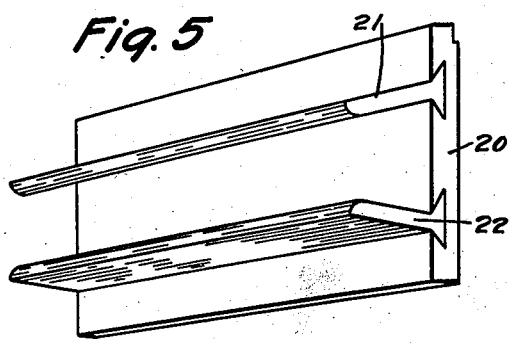
INVENTOR.
Robert MacFarlane
BY & Robert McCormack
James Harrison Bowen
ATTORNEY.

Patented Feb. 14, 1939

2,146,829

UNITED STATES PATENT OFFICE 2,146,829

CONTINUOUS BASE RECEPTACLE

Robert MacFarlane, Astoria, Long Island, N. Y., and Robert McCormack, Kearney, N. J.

Application June 4, 1938, Serial No. 211,736

1 Claim. (Cl. 247—3)

The purpose of this invention is to provide improvements in base receptacles of the continuous type, in which the openings are closed inside of the molding or receptacle, and also in which all wiring in the molding or receptacle is eliminated except at the ends thereof.

The invention is an elongated box adapted to be inserted in or on the face of a wall, or it may form a part of the base-board or molding, in which elongated slots are provided in the face, with frictionally holding and closing members mounted in the slots, and also with continuous bus bars molded in an insulating base and positioned to correspond with the slots.

Many attempts have been made to overcome the inconvenience of having base receptacles located at points, and similar devices have been provided with bus bars behind slots, and other means have been provided for closing the slots, but these devices have not been successful because they are too costly, and, furthermore, any form of open slot without a positive elastic closure is objectionable because they allow air and dust to enter the receptacle, gradually filling the same, and, although spring metal and other closures, such as separable fasteners have been provided, these are too costly for ordinary use, so that it has been found desirable to simplify the closure by using a relatively small strip of rubber with a central slit through which the contact prongs of a plug may be forced. Without these rubber strips, it is also possible to receive a shock by the prongs engaging metal, particularly in a faulty plug, whereas, with the rubber inserts, this is positively prevented. Other similar devices have used a plurality of contact points connected by wires, but any wiring in a device of this nature is objectionable, and any form of continuous metal contact that requires complicated construction is too costly, so that it has been found desirable to directly mount two bus bars by molding their ends in a strip of insulating material, such as a phenol insulator, so that the entire device may be insulated as a unit, and the only connections necessary to electric wires are at the end of the bus bars.

The object of this invention is, therefore, to improve receptacles or outlets by providing insulating closures for the prong receiving openings thereof.

Another object is to provide improvements in continuous plug outlets by providing continuous bus bars therein.

Another object is to provide improvements in continuous outlets, in which the outlets are formed by slots with their edges insulated in a relatively small, elongated box which may be used as a finish or as a strip of molding.

A further object is to provide continuous outlets in which all wiring, screws, or other connecting parts, are eliminated except at the ends of the bus bars.

And a still further object is to provide continuous outlets for plugs of electric fixtures and the like, which are provided with sealing means for the openings and bus bars which are of a simple and economical construction.

With these ends in view the invention embodies a relatively thin shell, with slots insulated by strips having relatively long slits, with the inner edges of the rubber strips extending inward and coming together, providing sealing means, and with the outer parts of the said rubber strips grooved to receive the edges of the shell surrounding the slots; and also continuous metallic bus bars dovetailed in strips of insulating material sloping toward a central point, providing a wedge action for contact prongs or plugs, and positioned to engage said prongs when the prongs are inserted through the slits in the strips of rubber.

Other features and advantages of the invention will appear from the following description, taken in connection with the drawing, wherein:—

Figure 1 is a view showing a typical arrangement of the continuous outlets.

Figure 2 is a detail showing a cross section through the outlets, with the complete box-like molding positioned on the outside of the wall surface.

Figure 3 is a detail showing the shell forming the cover.

Figure 4 is a section similar to that shown in Figure 2, with the plug omitted, and also showing an alternate design in which the upper surface of the shell forms a molding strip.

Figure 5 is a detail showing a typical mounting for the bus bars.

In the drawing the outlets are shown as they may be made, wherein numeral 1 indicates the shell, numeral 2, the rubber strips, and numerals 3 and 4, the bus bars.

In the design shown in Figures 1, 2 and 3, the shell 1 is formed of a relatively thin sheet of material, with slots 5 and 6 extending continuously through the intermediate part, with the ends spaced from the ends of the shell as shown in Figure 1, and the rubber strips 2 may be sprung into these slots, with grooves 7 and 8 in the upper and lower surfaces into which the edges of the metal, corresponding with the edges of the slots, extend as shown. The inner parts of the rubber strips 2 extend inward, forming flanges 9 and 10, and these are curved toward the center of the slots so that they meet at a point 11, providing a positive seal for the openings; and it will be noted that, as prongs 12 and 13 of an electric plug 14 are forced into the slits 15 of the strips 2, they will open the inner ends at the point 11, as shown in Figure 2, so that the prongs may extend through the strips 2 and contact the bus bars 3 and 4 extending outward from a base 16, and, when the plug is withdrawn, the inner ends of the rubber strips will move back together, closing the openings and providing a complete seal.

The bus bars 3 and 4, which may be made of copper, brass, or any suitable material, are shown dovetailed in slots 17 and 18, in which they may be molded in the base 16, however, it will be understood that these bars may be of any shape or design, and may be mounted in any manner.

In the design shown in Figure 2, the base 16 is provided with an outwardly extending flange 19, and, in Figure 5, this flange is omitted and the bus bars are mounted in a flat slab 20 in which the bars are indicated by the numerals 21 and 22. It will be understood, however, that these bars may be mounted in any manner.

In the design shown in Figure 4, the device forms the complete base-board or molding, in which the shell is indicated by the numeral 23, and this is provided with slits 24 and 25 in which the rubber strips 2 may be mounted, and the upper edge is curved upward as shown at the point 26, however, it will be understood that this may be flat or of any shape, and also that the lower part may be curved or formed of any design.

It will be understood that other changes may be made without departing from the spirit of the invention. One of which changes may be in the shape or design of the shell or case, another may be in the use of slots of any other length, as it will be understood that these may be relatively short or long, or may be continuous, or these may be divided at any point or points, and still another may be in the shape or arrangement of the bus bars, as any means may be used for providing contacts adapted to be engaged by the prongs of a plug at any point.

The construction will be readily understood from the foregoing description. In use the parts may be provided as shown and described, and the device may be installed in a continuous slot in a wall so that it is flush with the face thereof, or it may be placed upon the top of a base-board, or used as molding, or may extend from a wall as shown in Figure 2, or, as hereinbefore stated, may be arranged in any manner or positioned at any point. With this device installed as shown and described a plug may be inserted at any point along the base of the wall, and, at the same time, it is only necessary to have two connections at the ends of the bus bars to electric wires, so that all screws and fastenings of any type are eliminated except at the end, and, at the same time, with the strips of rubber as shown and described, the openings are completely sealed. It will also be understood that the bus bars, shell, and sealing strips may be of any material instead of metal insulation and rubber as shown and described.

Having thus fully described the invention, what we claim as new, and desire to secure by Letters Patent, is:

A continuous base outlet of the type comprising a receptacle extending continuously along the base of a wall or the like having elongated slots in the face thereof, with continuous bus bars mounted in an insulating base behind and corresponding with the slots, means sealing said slots comprising strips of rubberlike insulating material having slits therein mounted in the slots, with flanges extending inwardly on each side of the slits with the inner ends curved together for closing the said slits.

ROBERT MacFARLANE.
ROBERT McCORMACK.